(12) United States Patent
Wenzel et al.

(10) Patent No.: US 10,269,115 B2
(45) Date of Patent: Apr. 23, 2019

(54) IMAGING DATA STATISTICAL TESTING INCLUDING A STEREOTACTICAL NORMALIZATION WITH A PERSONALIZED TEMPLATE IMAGE

(71) Applicant: KONINKLIJKE PHILIPS N.V., Eindhoven (NL)

(72) Inventors: Fabian Wenzel, Hamburg (DE); Stewart Young, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 201 days.

(21) Appl. No.: 15/325,102

(22) PCT Filed: Jul. 6, 2015

(86) PCT No.: PCT/IB2015/055088
§ 371 (c)(1),
(2) Date: Jan. 10, 2017

(87) PCT Pub. No.: WO2016/009300
PCT Pub. Date: Jan. 21, 2016

(65) Prior Publication Data
US 2017/0186155 A1   Jun. 29, 2017

Related U.S. Application Data

(60) Provisional application No. 62/024,488, filed on Jul. 15, 2014.

(51) Int. Cl.
*G06K 9/00* (2006.01)
*G06T 7/00* (2017.01)
(Continued)

(52) U.S. Cl.
CPC .............. *G06T 7/0012* (2013.01); *G06T 7/30* (2017.01); *G06T 11/60* (2013.01);
(Continued)

(58) Field of Classification Search
None
See application file for complete search history.

(56) References Cited

U.S. PATENT DOCUMENTS

| | | | |
|---|---|---|---|
| 2007/0218002 A1 | 9/2007 | Barrio | |
| 2011/0046451 A1 | 2/2011 | Horn | |

(Continued)

FOREIGN PATENT DOCUMENTS

| | | |
|---|---|---|
| WO | 2008/107809 | 9/2008 |
| WO | 2008155682 | 12/2008 |

(Continued)

OTHER PUBLICATIONS

Unser, et al., "Registration and Statistical Analysis of PET Images Using the Wavelet Transform", IEEE Engineering in Medicine and Biology Magazine, vol. 14, No. 5, Sep. 1995.

(Continued)

*Primary Examiner* — Atiba O Fitzpatrick

(57) ABSTRACT

A method includes obtaining an image of a subject to process via statistical testing. The method further includes obtaining a subject personalized template image, which is personalized to the subject based on a predetermined characteristic of the subject. The method further includes registering the subject personalized template image to the image of the subject. The method further includes performing statistical testing using the subject personalized template image registered to the image of the subject. A computing system (304) includes a memory (320) that stores a statistical testing module (320) and data (324). The computing system further includes a processor (318) that executes the one or more instructions, which causes the processor to: perform voxel-wise statistical testing of a functional image using a subject personalized template image for stereotactical normalization of the voxel-wise statistical testing.

20 Claims, 4 Drawing Sheets

(51) Int. Cl.
 *G06T 7/30* (2017.01)
 *G06T 11/60* (2006.01)
(52) U.S. Cl.
 CPC ............ *G06T 2207/10104* (2013.01); *G06T 2207/20128* (2013.01); *G06T 2207/30016* (2013.01)

(56) References Cited

U.S. PATENT DOCUMENTS

| | | | |
|---|---|---|---|
| 2011/0160543 A1 | 6/2011 | Parsey | |
| 2013/0129168 A1 | 5/2013 | Ross | |
| 2014/0307936 A1* | 10/2014 | Dore | G06T 7/0014 382/131 |
| 2014/0350392 A1* | 11/2014 | Lundqvist | A61B 6/037 600/425 |

FOREIGN PATENT DOCUMENTS

| | | |
|---|---|---|
| WO | 2013/040693 | 3/2013 |
| WO | 2013/049684 | 4/2013 |
| WO | 2013/086580 | 6/2013 |

OTHER PUBLICATIONS

Buchert et al., "Adjusted scaling of FDG positron emission tomography images for statistical evaluation in patients with suspected Alzheimer's disease," Journal of Neuroimaging 2005; 15(4): 348-355.

Mosconi et al., "18F-FDG PET Database of Longitudinally Confirmed Healthy Elderly Individuals Improves Detection of Mild Cognitive Impairment and Alzheimer's Disease Emission Tomography Images for Statistical Evaluation in Patients With Suspected Alzheimer's Disease" The Journal of Nuclear Medicine 2007; (48):1129-1134.

* cited by examiner

IMAGING DATA STATISTICAL TESTING INCLUDING A STEREOTACTICAL NORMALIZATION WITH A PERSONALIZED TEMPLATE IMAGE

CROSS REFERENCE TO RELATED APPLICATIONS

This application is the U.S. National Phase application under 35 U.S.C. § 371 of International Application No. PCT/IB2015/055088, filed Jul. 6, 2015, published as WO 2016/009300 on Jan. 21, 2016, which claims the benefit of U.S. Provisional Patent Application No. 62/024,488 filed Jul. 15, 2014. These applications are hereby incorporated by reference herein.

The following generally relates to imaging processing and more particularly to imaging data statistical testing including a stereotactical normalization with a personalized template image, and is described with particular application to positron emission tomography (PET) imaging.

PET imaging can be used to image physiological activities in a subject by imaging a spatial distribution of a radiopharmaceutical tracer introduced into the subject. An example of such a tracer is [$^{18}$F]Fluorodeoxyglucose (FDG), which is a glucose analogue. As the radiopharmaceutical decays, positrons are emitted. A coincident pair of 511 keV gamma rays is generated in response to a positron interacting with an electron in a positron annihilation event. The gamma rays travel in opposite directions along a line of response, and a gamma ray pair detected by the PET imaging system within a coincidence time window is recorded as an annihilation event. The events are reconstructed to produce an image of the distribution of the radionuclide and, hence, tracer uptake by tissue.

The literature indicates that dementia has been identified as a global health priority topic by the World Health Organization. Dementia is expected to have a major impact on future care and diagnosis, due to the ageing society and improved treatments for diseases. Public studies have shown that the role of imaging for the detection and differential diagnosis of neuro-degenerative diseases is increasing. This trend is leading to an increasing availability of technologies for the automated quantification of brain scans. Voxel-wise statistical testing is an image quantification technique which is increasingly used for FDG-PET brain scans of subjects with suspected neuro-degenerative diseases. However, there is wide variability in the appearance of FDG-PET brain scans, which may introduce error into the voxel-wise statistical testing.

For example, the brain ventricles, which include the system of cavities inside the brain that are filled with cerebrospinal fluid, enlarge with age and with progression of a neuro-degenerative disease like Alzheimer's due to both physiological and pathological degeneration of the neural structures which comprise the majority of the brain. The enlargement of the ventricles affects the overall appearance of an FDG-PET brain scan since the ventricle regions, which are not metabolically active, appear as large regions of low signal intensity. Unfortunately, the age-based ventricle size variation introduces error into the stereotactical normalization step, which includes registering a subject brain image with a single pre-generated template image, which, in general, is an average image generated from multiple brain images of different subjects.

Where the ventricle in the subject image is enlarged due to age and is allowed to deform during the registration, stretching artifact might be introduced into the stereotactically normalized subject image. For example, the registration process may stretch small areas of the image to ensure a mathematical constraint requiring the ventricular borders of the subject image to match the morphology of the used template image. This is illustrated in FIG. 1, which shows that small regions in the original subject image need to be heavily deformed if the ventricle size between the original subject image and static template image differ. Although hypo-metabolic lesions may be correctly detected, the visual impression of the warped brain image may not be well-suited for visual observation and evaluation by a clinician.

An approach to mitigate the visually observable stretching artifact is to include a registration constraint that prohibits deformation near the ventricle borders. However, this approach introduces artifacts near the ventricular borders that might be incorrectly detected as hypo-metabolic tissue. This is illustrated in FIG. 2, which shows a registered PET brain image with an overlay superimposed thereover and showing hypo-metabolic areas. In FIG. 2, a first region 202 represents a true hypo-metabolism coinciding with brain tissue, and a second region 204 represents artifact caused by enlarged ventricles after registration. The artifacts appear because the template image contains smaller ventricles than the enlarged ventricles in the subject image. This artifact may lead to false positive detection of hypo-metabolic tissue.

Unfortunately, there is no image registration technique in the state of art that can avoid both of the above discussed artifacts (i.e., anatomical stretching and false hypo-metabolism regions) as the artifacts arise due to an inherently ill-posed problem of establishing spatial correspondence between the subject image and the template image, which, again, is a predetermined average image of a set of subject images with varying subject ventricle size.

Aspects described herein address the above-referenced matters and others.

The following describes an approach for image voxel statistical testing that can mitigate stretching artifact and/or false positives. The stereotactically normalization step of the image voxel statistical testing described herein employs a subject-personalized template image, which is dynamically identified (e.g., selected, generated, etc.) based on predetermined criteria characteristic of the subject (e.g., subject age, brain ventricle size, etc.) for the subject image being processed. As a result, the spatially normalized subject image will have reduced stretching artifact and/or false positives relative to image voxel statistical testing using a single static generic template image, which is an average image generated from multiple images of different subjects, for all subjects.

According to one aspect, a method includes obtaining an image of a subject to process via statistical testing. The method further includes obtaining a subject personalized template image, which is personalized to the subject based on a predetermined characteristic of the subject. The method further includes registering the subject personalized template image to the image of the subject. The method further includes performing statistical testing using the subject personalized template image registered to the image of the subject.

In another aspect, a computing system includes a memory that stores a statistical testing module and data. The computing system further includes a processor that executes the one or more instructions, which causes the processor to: perform voxel-wise statistical testing of a functional image using a subject personalized template image for stereotactical normalization.

In another aspect, a computer readable storage medium is encoded with computer readable instructions. The computer readable instructions, when executed by a processor, causes the processor to: identify a subject personalized template image for a stereotactical normalization step of a voxel-wise statistical testing of a functional image of the subject, wherein the subject personalized template image is based on at least one of an age of the subject or a size of anatomical tissue of interest of the subject, and perform a voxel-wise statistical testing of the functional image using the subject personalized template image for the stereotactical normalization step.

The invention may take form in various components and arrangements of components, and in various steps and arrangements of steps. The drawings are only for purposes of illustrating the preferred embodiments and are not to be construed as limiting the invention.

Figure 1:
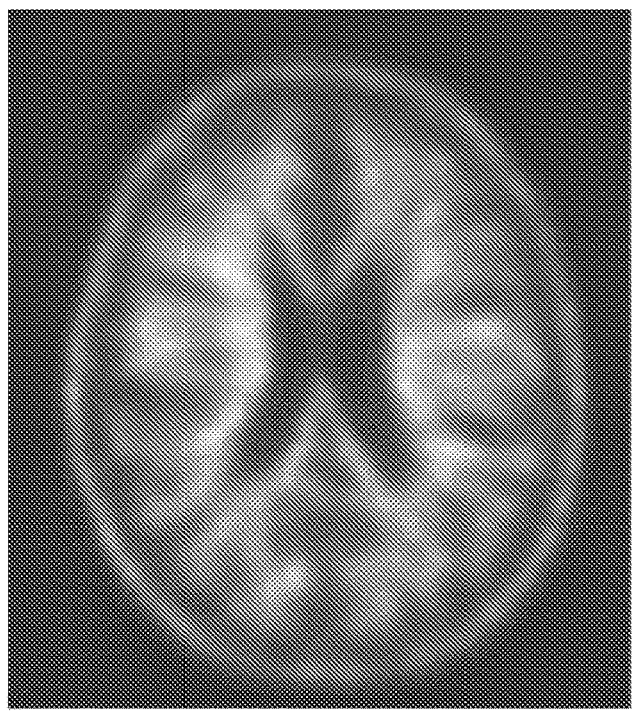
FIG. 1 shows ventricle stretching artifact in a brain image due to unrestrained ventricle deformation in subject image-to-template image registration.
Figure 2:
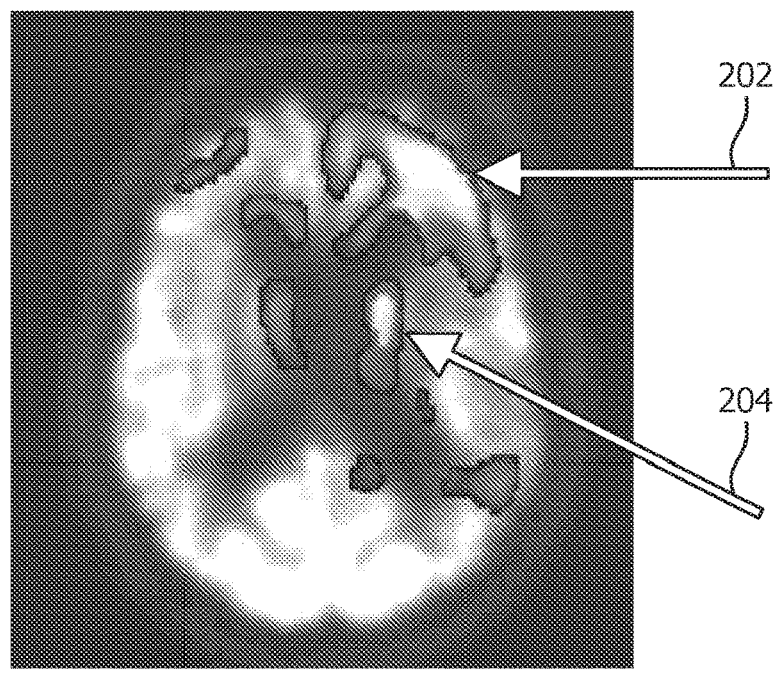
FIG. 2 shows a true hypo-metabolic area in a brain image and a false hypo-metabolic area in the brain image, which is due to restraining ventricle deformation in the subject image-to-template image registration.
Figure 3:
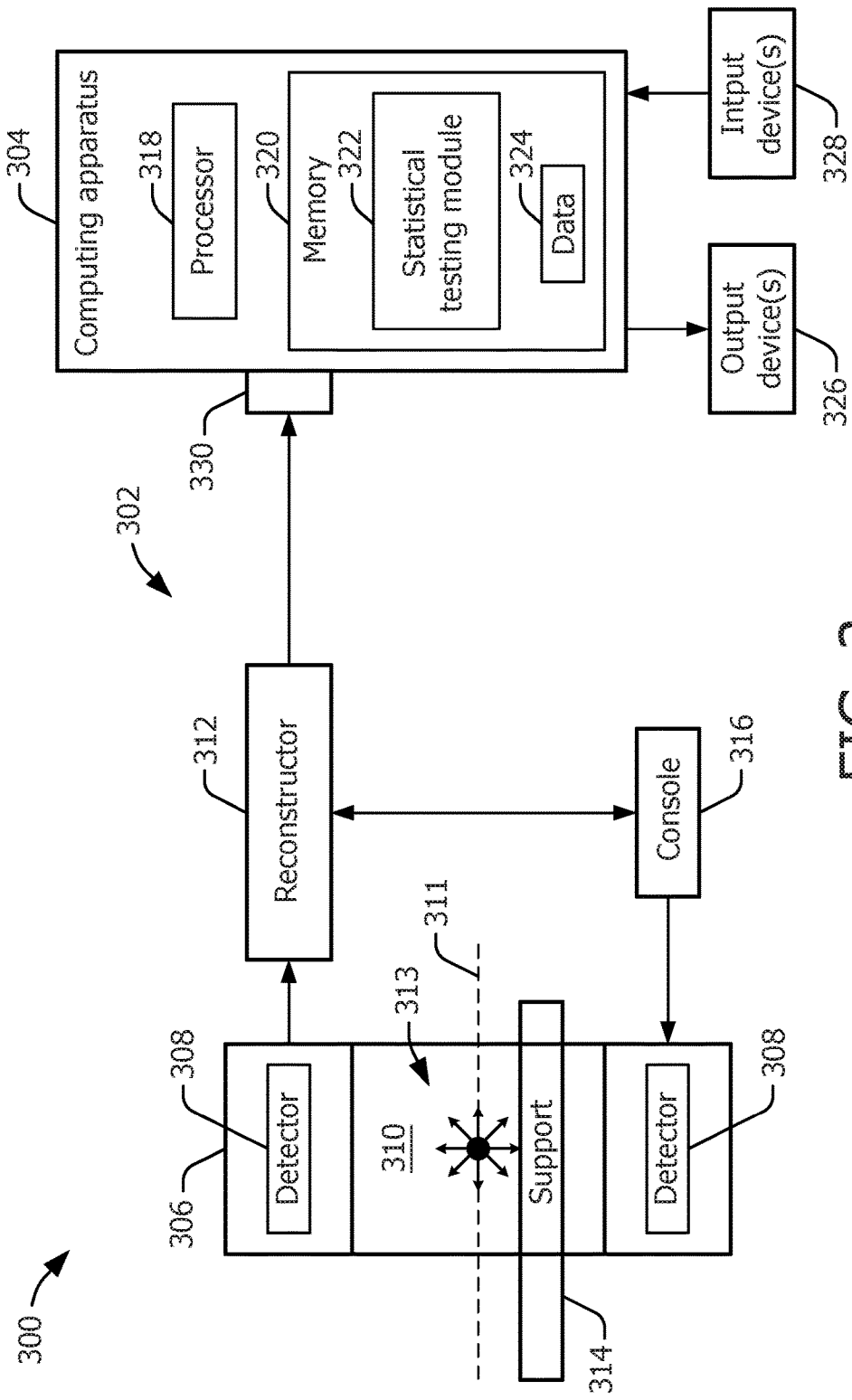

FIG. 3 schematically illustrates a system that includes an example computing apparatus that performs statistical testing on subject images and an imaging apparatus, which generates subject images.

Figure 4:
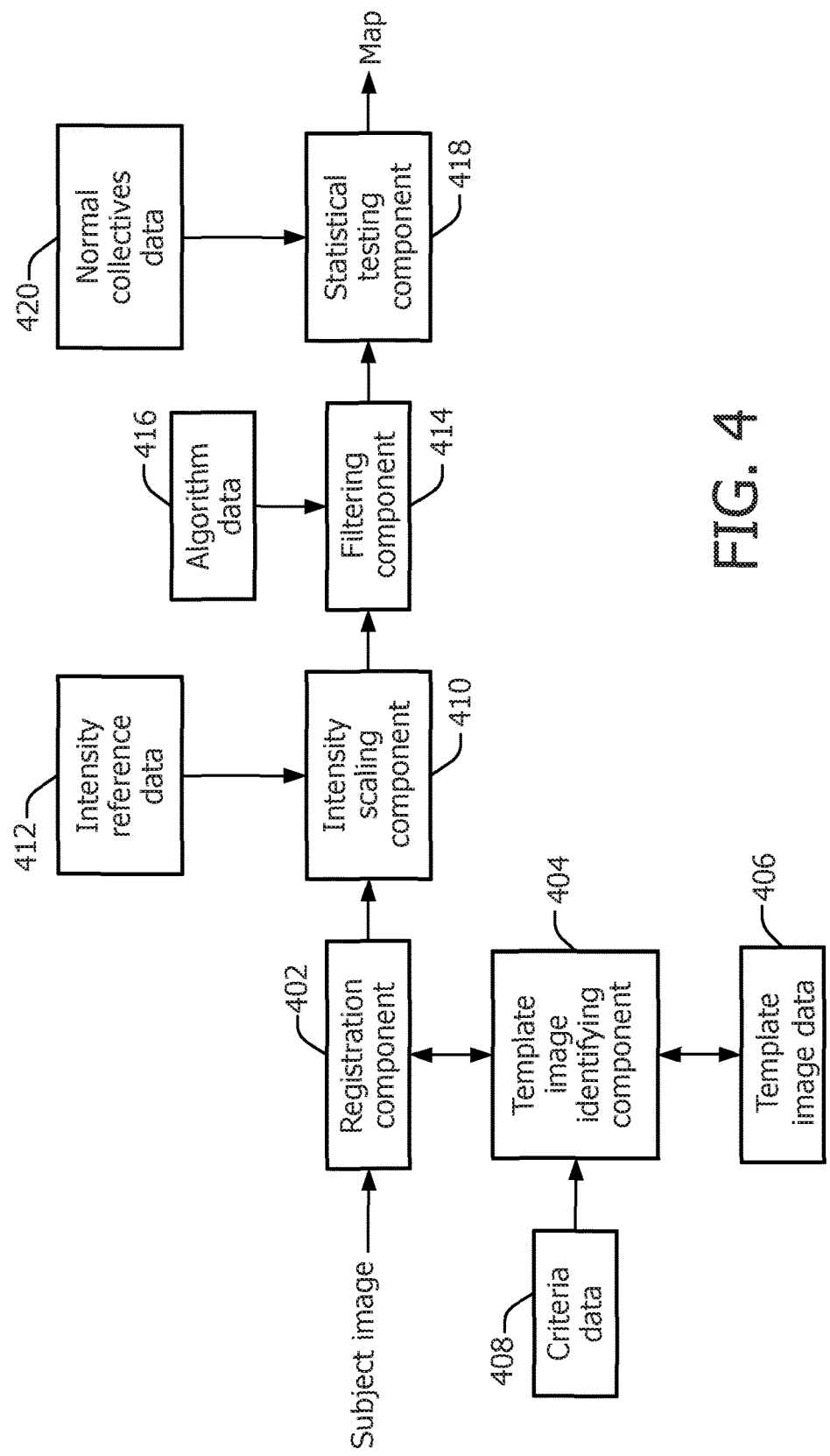

FIG. 4 schematically illustrates an example of statistical testing components and data of the computing apparatus.

Figure 5:
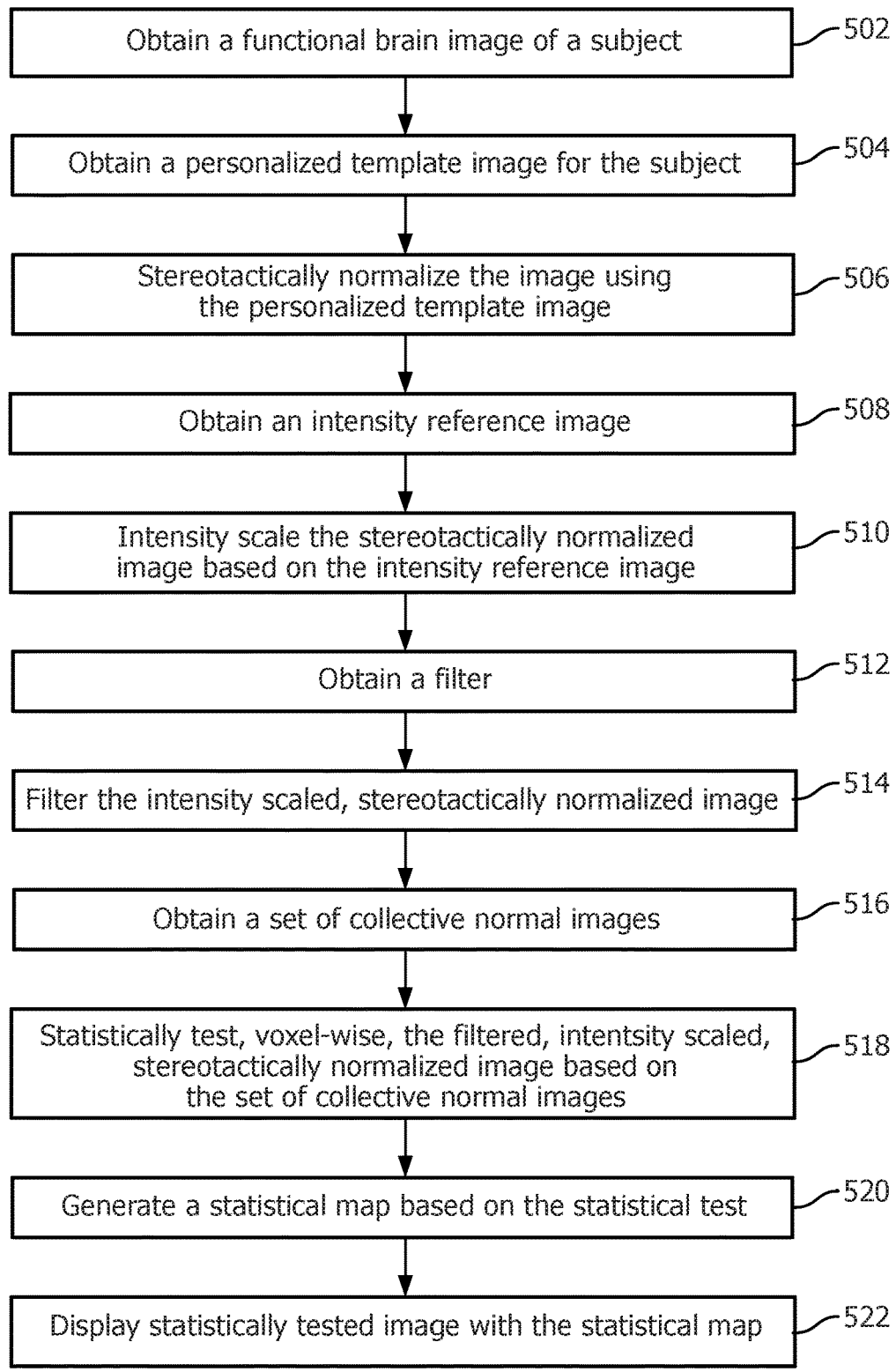

FIG. 5 illustrates a method for stereotactical normalizing a subject image using a personalized template image in a voxel-wise statistical test of the subject image.

Described herein is an approach for image voxel statistical testing that can mitigate stretching artifact, false positives, and/or other artifact resulting from using a single static template image for the stereotactical normalization step of the image voxel statistical testing. This approach selects, generates, etc. a subject-personalized template image, based on predetermined criteria characteristic of the subject (e.g., subject age, tissue of interest size, etc.).

Initially referring to FIG. 3, a system 300, which includes an imaging apparatus 302, such as a positron emission tomography (PET) imaging system, and a computing apparatus 304, is schematically illustrated.

The imaging apparatus 302 includes a gantry 306 and at least one gamma radiation sensitive detector 308 (two shown in the embodiment of FIG. 3) disposed about an examination region 310 along a longitudinal axis 311 in a generally annular arrangement. A suitable detector 308 includes one or more scintillation crystals and corresponding photosensors, such as photomultiplier tubes, photodiodes, etc., where a crystal produces light when struck by a gamma ray, and a photosensors receives the light and generates a signal indicative thereof. The detector 308 detects gamma radiation characteristic of positron annihilation events 313 occurring in the examination region 310.

When configured to operate in list mode, the signal is processed to generate a list of detected annihilation events, including information such as a time at which an event is detected, as well as a position and orientation of a corresponding line-of-response (LOR). When configured with time-of-flight (TOF) capabilities, an estimate of the position of the annihilation along the LOR is also provided. The imaging apparatus 302 further includes a reconstructor 312 that reconstructs the data using a suitable reconstruction algorithm and generates image data and/or one or more images indicative of the distribution of the decay in the scanned object or subject.

The imaging apparatus 302 further includes a subject support 314 that supports a subject (or object) in the examination region 310. The imaging apparatus 302 further includes an operator console 316 (e.g., a computer) that includes a human readable output device such as a monitor or display and one or more input devices such as a keyboard and mouse. A microprocessor of the console 316 executes software residing in computer memory that allows an operator to select and/or modify an imaging protocol (e.g., an FDG-PET imaging protocol), initiate, pause and terminate a scan (e.g., an FDG-PET scan), view and/or manipulate projection and/or image data (e.g., FDG-PET projection and/or image data), etc.

The computing apparatus 304 includes at least one processor 318 (e.g., a microprocessor, a central processing unit, etc.) and a computer readable storage medium ("memory") 320. The processor 318 executes the instructions of the statistical testing module 322. The memory 320 includes physical memory and/or other non-transitory storage medium (and excludes transitory medium). The memory 320 stores, at least, a statistical testing module 322, which includes instructions for implementing components of the module 322. The illustrated memory 320 further stores data 324 such as data used for statistical testing and/or results of statistical testing. The processor 318 may also execute an instruction(s) carried by a carrier wave, a signal, or other transitory medium.

The computing apparatus 304 further includes an output device(s) 326 such as a display monitor, a Filmer, etc. The computing apparatus 304 further includes an input device(s) 328 such as a mouse, keyboard, etc. The computing apparatus 304 further includes at least one interface 330, which is configured to interface with the imaging apparatus 302, for example to receive a subject image(s) from the imaging apparatus 302. In the illustrated example, the computing apparatus 304 interfaces, via the interface 330, at least with the reconstructor 312 of the imaging apparatus 302 and can receive images therefrom. The interface 330 may also provide an interface to a data repository (e.g., a PACS and/or other system) for obtaining images for statistical testing and/or other processing. The computing apparatus 318 can be part of the console 316 and/or separate therefrom (as in FIG. 3).

The instructions of the statistical testing module 322, when executed by the processor 318, cause the processor 318 to perform statistical testing on a subject image. In one instance, this includes: stereotactically normalizing the subject image with a subject-personalized template image; intensity scaling the stereotactically normalized subject image; filtering the intensity scaled, stereotactically normalized subject image; performing voxel-wise statistical testing on the filtered, intensity scaled, stereotactically normalized subject image, and generating a statistical map. The statistical map can be stored in the memory 320, displayed with the subject image (e.g., superimposed thereover as an overlay), conveyed to another apparatus, archived in a data repository, etc.

As described in greater detail below, the subject-personalized template image is dynamically identified (e.g., selected, generated, etc.) based on predetermined criteria characteristic of the subject (e.g., subject age, anatomical tissue type of interest size (e.g., ventricle size in a brain image), etc.) and the subject image being processed, and includes anatomical structure that matches, geometrically, the anatomical structure in the subject image. As a result, the stereotactical normalization step of the statistical testing only entails minor local deformations due to the characteristic. With brain images, this can mitigate stretching artifact and/or false hypo-metabolism regions, which can occur when using a generic template image, generated as an average image from a plurality of subject images of different subjects.

FIG. 4 schematically illustrates example components of the statistical testing module 322.

A registration component 402 stereotactically normalizes a subject image by registering the subject image with a subject personalized template image. The registration component 402 can use an affine (or rigid) transform (i.e., a linear transformation, which include rotation, scaling, translation, etc.) and/or an elastic (or non-rigid) transformation (i.e., a transformation that additionally allows for warping of structure in the image).

A template image identifying component 404 identifies the subject personalized template image for the stereotactical normalization. In the illustrated embodiment, the template image identifying component 404 identifies the subject personalized template image by identifying information of template image data 406 based on predetermined criteria data 408.

By way of non-limiting example, in one instance, the criteria data 408 instructs the template image identifying component 404 to identify a subject personalized template image based on an age of the subject. For this, the template image identifying component 404 retrieves the age of the subject, e.g., from the image from indicia superimposed on the image, from data in a field of a data file including the image, from a user input, etc. The template image identifying component 404 then selects the subject personalized template image from the template image data 406 based on the age.

For example, the template image data 406 may include a set of template images, each corresponding to a particular age or age range. For instance, the template image data 406 may have a template image for an age range of 60-69 (created from images of subjects 60-69 years old), a template image for an age range of 70-79, etc. The age based subject personalized template images can be stored local (as illustrated) or external to the memory 320, and retrieved.

In a variation, the template image identifying component 404 selects an age based transformation from the template image data 406 based on the age of the subject. For example, the template image data 406 may include a set of transformations, each corresponding to a particular age or age range. For instance, the template image data 406 may have a transformation for an age range of 60-69 (created from images of subjects 60-69 years old), a transformation for an age range of 70-79, etc.

In this variation, the template image identifying component 404 generates the subject personalized template image for an age or age range dynamically by transforming a general template image with the appropriate transformation for the age or age range. The general template image can be created by averaging images of subjects of different ages. The general template image and/or the age specific transformation can be stored local (as illustrated) or external to the memory 320, and retrieved.

Other approaches for identifying subject personalized template image for the stereotactical normalization based on age are also contemplated herein.

In another non-limiting example, in connection with a brain image, the criteria data 408 instructs the template image identifying component 404 to identify that a subject personalized template image based on a size of the brain ventricles in the subject image. For instance, the template image data 406 may include a plurality of template images respectively corresponding to small, medium, large, etc. sizes (or some other size-based delineation). These different templates can be predetermined, for example, by averaging and/or otherwise using previously acquired images, which are separated into groups based on ventricle size.

The template image identifying component 404 can then select the subject personalized template image which would result in minimal residual deformations for the particular subject image being processed. This can be achieved, for example, by determining residual deformations for one or more of the template images and then selecting the template image resulting in the lowest residual deformations. In another instance, the template image identifying component 404 can then select the subject personalized template image based on a user input indicative of a subject personalized template image of interest.

In a variation, both age and ventricle size are used to identify the template image. In yet another variation, other information is additionally or alternatively used to identify the template image.

The output of the registration component 420 is a spatially normalized subject image.

An intensity scaling component 410 scales the spatially normalized subject image based on intensity reference data 412. For example, the intensity scaling component 410, in one instance, scales the intensity of the spatially normalized image so that the brightness of the voxels of the spatially normalized image correspond to the normal collective images.

A filtering component 414 filters the intensity scaled, spatially normalized subject image based on a filter from algorithm data 416. In one instance, this includes low pass filtering the intensity scaled, spatially normalized image, which smoothes the image and reduces noise (e.g., Gaussian noise). The filter can be a default filter, a user selected filter, a user preferred filter, etc. In one instance, the filter is selected based on an estimated size of tissue of interest (e.g., a lesion, a tumor, etc.), which may mitigate blurring the tissue of interest.

A statistical testing component 418 performs statistical testing on the filtered, intensity scaled, spatially normalized subject image, based on normal collective images of normal collective data 420. The normal collective data 420 includes a plurality of images, which are compared with the filtered, intensity scaled, spatially normalized image.

In one instance, each voxel of each of the normal collective images is compared with each voxel of the filtered, intensity scaled, spatially normalized image. In another instance, a mean and standard deviation is computed for corresponding voxels of the normal collective images, and the mean and standard deviation for each voxel is respectively compared with each voxel of the filtered, intensity scaled, spatially normalized image. Other approaches are also contemplated herein.

Databases of normal collectives are discussed in Buchert et al., "Adjusted Scaling of FDG Positron," Journal of Neuroimaging 2005; 15(4): 348-355, and Mosconi et al., "18F-FDG PET Database of Longitudinally Confirmed Healthy Elderly Individuals Improves Detection of Mild Cognitive Impairment and Alzheimer's Disease Emission Tomography Images for Statistical Evaluation in Patients With Suspected Alzheimer's Disease The Journal of Nuclear Medicine 2007; (48):1129-1134.

The output of the statistical testing component 418 is a statistical map. In one instance, the statistical map can be superimposed over the subject image and displayed, and used to visually indicate suspected lesion areas. The combined images can be displayed, for example, via a display monitor of the output device(s) 326 in a graphical user interface (GUI).

It is to be appreciated that the statistical testing module 322 of FIG. 4 can be a "closed" system that performs statistical testing without any user input. In another instance, the statistical testing module of FIG. 4 may allow for user input to direct one or more of selecting a template image (e.g., standard, age-based, size-based, etc.), an intensity scaling, a filter, a normal collective, a statistical testing algorithm, etc.

It is also to be appreciated that the statistical testing module 322 can be trained or learn based on a statistical test. This may include learning from feedback provided by the user indicating the quality of the statistical map, which may indicate whether the particular approach (e.g., age based, ventricle size based, etc.) used to generate the subject personalized template image was a good choice, whether one approach relative to another approach resulted in a superior statistical map, etc.

It is also to be appreciated in the statistical testing module 322 can suggest to the user that if the statistical map is normal and the subject does not suffer, based on the PET-FDG image, from a neuro-degenerative disease that this scan is a candidate to include in the normal collective and/or to use to update the corresponding template image.

FIG. 5 illustrates a method voxel-wise statistical testing of the subject image using a subject personalized template image for stereotactical normalization.

It is to be appreciated that the ordering of the acts is not limiting. As such, other orderings are contemplated herein. In addition, one or more acts may be omitted and/or one or more additional acts may be included.

At 502, a functional (e.g., PET) brain image is obtained for voxel-wise statistical testing. As discussed herein, the image can be obtained from the imaging apparatus 302, another imaging apparatus, a data repository, etc.

At 504, a template image personalized to the subject is obtained. As described herein, in one instance, this may include retrieving a pre-generated age, ventricle size, etc. based template image for the subject, a size of the ventricles in the subject image, generating, e.g., on the fly, such a template image based on a general image and a predetermined age, ventricle size, etc. based transformation, etc.

At 506, the functional image is stereotactically normalized based on the subject personalized template image.

At 508, an intensity reference image is obtained.

At 510, the stereotactically normalized functional image is intensity scaled using on the intensity reference image.

At 512, a filter is obtained.

At 514, the intensity scaled, stereotactically normalized functional image is filtered using on the filter.

At 516, a set of normal collectives are obtained.

At 518, the filtered, intensity scaled, stereotactically normalized functional image is statistically tested, voxel-wise, based on the set of normal collectives.

At 520, a statistical map is generated based on a result of the statistically test.

At 522, the filtered, intensity scaled, stereotactically normalized functional image is displayed with the statistical map superimposed thereover.

The above methods may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The approach described herein can be used for various applications in connection with diseases such as, but not limited to, Alzheimer's, Parkinson's disease, Amyloid-PET image analysis, and/or other applications.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
   obtaining a positron emission tomography (PET) image of a subject to process via statistical testing;
   dynamically identifying a subject personalized template image based on a predetermined characteristic of the subject;
   registering the subject personalized template image to the PET image of the subject to create a stereotactically normalized functional image; and
   performing statistical testing using the stereotactically normalized functional image.

2. The method of claim 1, wherein the predetermined characteristic of the subject is at least one of information external to the image of the subject or information contained in the image of the subject.

3. The method of claim 1, wherein the predetermined characteristic of the subject is at least one of an age of the subject or a size of a predetermined anatomical tissue type of the subject.

4. The method of claim 1, further comprising:
   selecting the subject personalized template image from a plurality of template images corresponding to different ages.

5. The method of claim 4, further comprising:
   generating an age-based template image by determining an average image from a set of images of subjects of the age or within a predetermined range including the age.

6. The method of claim 1, further comprising:
   generating the subject personalized template image based on a general template image and an age-based transformation corresponding to the age of the patient.

7. The method of claim 1, further comprising:
   selecting the subject personalized template image from a plurality of template images corresponding to different anatomical tissue types.

8. The method of claim 7, further comprising:
   selecting the subject personalized template image by matching a size of the anatomical tissue type in the functional image with a size of the anatomical tissue type in each of a plurality of templates, determining a residual deformation for each match, and selecting the template image which results in a smallest residual deformation.

9. The method of claim 7, further comprising:
   generating a size-based template image template by determining an average image from a set of images of subjects having an anatomical tissue type size within a predetermined size range.

10. The method of claim 1, wherein the PET image is a brain image.

11. The method of claim 1, further comprising:
intensity scaling the stereotactically normalized functional image using an intensity reference image;
filtering the intensity scaled, stereotactically normalized functional image;
performing a voxel-wise statistical test on the filtered, intensity scaled, stereotactically normalized functional image, using a normal collective; and
generating a statistical map based on a result of the voxel-wise statistical test.

12. The method of claim 11, further comprising:
visually displaying the filtered, intensity scaled, stereotactically normalized functional image with the statistical map superimposed thereover.

13. The method of claim 11, further comprising:
generating a signal indicating the functional image is a candidate image for updating the normal collective in response to the statistical map indicating the subject does not have neuro-degenerative disease.

14. The method of claim 1, wherein the personalized template image mitigates at least one of stretching artifact or false hypo-metabolism detection.

15. A computing system, comprising:
a memory that stores a statistical testing module and data; and
a processor that executes the one or more instructions, which causes the processor to:
dynamically identify a subject personalized template image based on a predetermined characteristic of the subject;
register the subject personalized template image to a PET functional image of the subject to create a stereotactically normalized functional image; and
perform voxel-wise statistical testing of the PET functional image using the stereotactically normalized functional image.

16. The computing system of claim 15, wherein the executing of the one or more instructions further causes the processor to:
select an age-based template image from a plurality of template images corresponding to different ages or age ranges based on an age of the subject and perform the voxel-wise statistical testing of the functional image using the selected age-based template image for the stereotactical normalization.

17. The computing system of claim 15, wherein the executing of the one or more instructions further causes the processor to:
generate an age-based template image from a plurality of age-based transformation corresponding to different ages or age ranges and a general template image, based on an age of the subject, and perform the voxel-wise statistical testing of the functional image using the generated age-based template image for the stereotactical normalization.

18. The computing system of claim 15, wherein the executing of the one or more instructions further causes the processor to:
select an anatomical tissue type size-based template image from a plurality of template images corresponding to different anatomical tissue type sizes and perform the voxel-wise statistical testing of the functional image using the selected size-based template image for the stereotactical normalization.

19. The computing system of claim 15, wherein the executing of the one or more instructions further causes the processor to:
generate a statistical map based on a result of the voxel-wise statistical testing; and
visually display the functional map with the statistical map superimposed thereover.

20. A computer readable storage medium encoded with one or more computer executable instructions, which, when executed by a processor of a computing system, causes the processor to:
dynamically identify a subject personalized template image for a stereotactical normalization step of a voxel-wise statistical testing of a PET functional image of the subject, wherein the subject personalized template image is based on at least one of an age of the subject or a size of anatomical tissue of interest of the subject; and
register the subject personalized template image to the PET functional image of the subject to create a stereotactically normalized functional image; and
perform a voxel-wise statistical testing of the PET functional image using the stereotactically normalized functional image for the stereotactical normalization step.

* * * * *